(12) United States Patent
Kim

(10) Patent No.: US 10,333,130 B2
(45) Date of Patent: Jun. 25, 2019

(54) SECONDARY BATTERY AND SECONDARY BATTERY MODULE

(71) Applicants: Samsung SDI Co., Ltd., Yongin-si, Gyeonggi-do (KR); Robert Bosch GmbH, Stuttgart (DE)

(72) Inventor: Dukjung Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 431 days.

(21) Appl. No.: 13/804,968

(22) Filed: Mar. 14, 2013

(65) Prior Publication Data

US 2014/0193696 A1 Jul. 10, 2014

(30) Foreign Application Priority Data

Jan. 10, 2013 (KR) .................. 10-2013-0003110

(51) Int. Cl.
*H01M 2/30* (2006.01)
*H01M 2/20* (2006.01)
*H01M 10/00* (2006.01)
*H01M 2/02* (2006.01)
*H01M 2/14* (2006.01)
*H01M 10/052* (2010.01)
*H01M 2/32* (2006.01)
*H01M 2/26* (2006.01)
*H01M 10/04* (2006.01)

(52) U.S. Cl.
CPC ............. *H01M 2/30* (2013.01); *H01M 2/202* (2013.01); *H01M 2/02* (2013.01); *H01M 2/14* (2013.01);

(Continued)

(58) Field of Classification Search
CPC ............ H01M 2/02; H01M 2/14; H01M 2/20; H01M 2/202; H01M 2/30; H01M 2/32;
(Continued)

(56) References Cited

U.S. PATENT DOCUMENTS 4,006,282 A 2/1977 Antoine
5,586,993 A 12/1996 Saito et al.
(Continued)

FOREIGN PATENT DOCUMENTS

JP 2004-071265 3/2004
JP 2009-289589 12/2009
(Continued)

OTHER PUBLICATIONS

KIPO Office action dated Apr. 29, 2016, for Korean priority Patent application 10-2013-0003110, (9 pages).

*Primary Examiner* — Jonathan G Jelsma
*Assistant Examiner* — Omar M Kekia
(74) *Attorney, Agent, or Firm* — Lewis Roca Rothgerber Christie LLP

(57) ABSTRACT

A secondary battery is provided including an electrode assembly including a first electrode plate, a second electrode plate, and a separator; a case containing the electrode assembly; a first current collector electrically connected to the first electrode plate; a first terminal electrically connected to the first current collector; a second current collector electrically connected to the second electrode plate; and a second terminal electrically connected to the second current collector, wherein a plating is on a portion of at least one of the first terminal or the first current collector at which the first terminal contacts the first current collector.

8 Claims, 11 Drawing Sheets

(52) U.S. Cl.
CPC .............. *H01M 2/20* (2013.01); *H01M 2/263* (2013.01); *H01M 2/32* (2013.01); *H01M 10/00* (2013.01); *H01M 10/04* (2013.01); *H01M 10/052* (2013.01)

(58) Field of Classification Search
CPC ...... H01M 2/263; H01M 10/00; H01M 10/04; H01M 10/052
USPC ....... 429/163, 186, 170, 175, 178, 179, 209, 429/211
See application file for complete search history.

(56) References Cited

U.S. PATENT DOCUMENTS

| | | | | |
|---|---|---|---|---|
| 2004/0023108 A1* | 2/2004 | Nakanishi | ............. | H01M 2/023 429/178 |
| 2005/0106455 A1* | 5/2005 | Yoshida | .................. | H01M 2/30 429/178 |
| 2009/0104510 A1* | 4/2009 | Fulop | ...................... | H01M 2/30 429/50 |
| 2010/0136423 A1* | 6/2010 | Seo et al. | ...................... | 429/181 |
| 2011/0081572 A1* | 4/2011 | Byun | ...................... | H01M 2/26 429/178 |
| 2011/0244317 A1* | 10/2011 | Lee et al. | ...................... | 429/182 |
| 2012/0196178 A1* | 8/2012 | Kambayashi | ........ | H01M 2/0456 429/179 |
| 2012/0237824 A1* | 9/2012 | Koh | ........................ | H01M 4/663 429/211 |
| 2012/0321943 A1 | 12/2012 | Ito | | |
| 2012/0328932 A1* | 12/2012 | Guen | .................... | H01M 2/024 429/179 |
| 2013/0202950 A1* | 8/2013 | Kim | .......................... | C09D 1/00 429/178 |

FOREIGN PATENT DOCUMENTS

| | | |
|---|---|---|
| JP | 2010-055992 | 3/2010 |
| KR | 1996-0002934 | 1/1996 |
| KR | 1998-019882 | 7/1998 |
| KR | 10-2013-0004078 | 1/2013 |

\* cited by examiner

SECONDARY BATTERY AND SECONDARY BATTERY MODULE

CROSS-REFERENCE TO RELATED APPLICATION

This application claims priority to and the benefit of Korean Patent Application No. 10-2013-0003110, filed on Jan. 10, 2013, the entire contents of which is incorporated herein by reference.

BACKGROUND

1. Field

Aspects of the present invention relate to a secondary battery and a secondary battery module.

2. Description of the Related Art

Unlike a primary battery which is not designed to be recharged, a secondary battery can be repeatedly charged and discharged. Low capacity secondary batteries that use single battery cells are used as power sources for various portable, small-sized electronic devices such as cellular phones and camcorders. High power secondary batteries that use a plurality of battery cells connected to each other in a battery pack are used as power sources for hybrid vehicles and electric vehicles.

The secondary battery may be classified into various types, including cylindrical and prismatic batteries. The secondary battery is generally configured by placing an electrode assembly having a positive plate, a negative plate, and a separator as an insulator interposed therebetween in a case with an electrolyte. A current collector and terminals electrically connected to the electrode assembly are included.

Clad metal is often used in a negative electrode of the secondary battery to connect a current collector made of copper to a terminal made of aluminum, which may increase the cost of the battery. In order to establish coupling of the negative electrode, clad metals make contact with and are coupled to other metals, resulting in corrosion at the contact and coupling area due to a potential difference between the metals. The corrosion may be expedited by an electrolyte. In this case, electrical conductivity of a current path including the current collector and the terminal may be lowered and a coupling force between the current collector and the terminal may also be lowered.

In addition, a bulk-type connection structure is generally used to connect the current collector and the terminal, which may increase the weight of the secondary battery.

BRIEF SUMMARY

Aspects of the present invention provide a secondary battery and secondary battery module, which can reduce or minimize corrosion forming at a current path and which is lighter weight due to a reduction in the weight of the current path.

In accordance with one embodiment of the present invention, there is provided a secondary battery including an electrode assembly including a first electrode plate, a second electrode plate, and a separator, a case containing the electrode assembly, a first current collector electrically connected to the first electrode plate, a first terminal electrically connected to the first current collector, a second current collector electrically connected to the second electrode plate, and a second terminal electrically connected to the second current collector, wherein a plating is on a portion of at least one of the first terminal or the first current collector at which the first terminal contacts the first current collector.

The first current collector may include copper, the first terminal may include aluminum, and the plating may include at least one of tin, nickel, or zinc.

The first current collector may have a first opening, and the first terminal may include a first terminal plate having a second opening and located outside of the case, and a first terminal pin having a first side and a second side, the first side fitted into the first opening, and the second side fitted into the second opening.

The first side of the first terminal pin may have a riveted portion around the first opening, and the second side of the first terminal pin may have a riveted portion around the second opening.

The first terminal pin may have one or more cavities having a depth along a central axis of the first terminal pin in at least one of the first side or the second side, and a first blocking part blocking a communication between the first side and the second side through the first terminal pin.

The plating may be on the first terminal pin and a portion of the first current collector adjacent to the first opening.

The first current collector may include a first connection plate electrically connected to the first electrode plate, a first extension plate extending from the first connection plate and having a first opening, and a first terminal pin having a first side and a second side, the first side may be fitted into the first opening, and the first terminal may include a first terminal plate having a second opening into which the second side of the first terminal pin is fitted, and the first terminal plate may be located outside of the case.

The first side of the first terminal pin may have a riveted portion around the first opening, and the second side of the first terminal pin may have a riveted portion around the second opening.

The first terminal pin may have one or more cavities having a depth along a central axis of the first terminal pin in at least one of the first side or the second side, and a first blocking part blocking a communication between the first side and the second side through the first terminal pin.

The plating may be on the first terminal pin and the first terminal plate.

In accordance with another embodiment of the present invention, there is provided a secondary battery module including a plurality of secondary batteries each including an electrode assembly, a case containing the electrode assembly, a current collector electrically connected to the electrode assembly, and a terminal electrically connected to the current collector, and a plurality of connection members electrically connecting terminals of neighboring ones of the plurality of secondary batteries, wherein a first plating is on a portion of at least one of each terminal or each of the connection members at which the terminal contacts a corresponding one of the connection members.

The electrode assembly may include a first electrode plate, a second electrode plate, and a separator, the current collector may include a first current collector electrically connected to the first electrode plate, and a second current collector electrically connected to the second electrode plate, the terminal may include a first terminal electrically connected to the first current collector, and a second terminal electrically connected to the second current collector, and a second plating may be on at least a portion of the first current collector or the first terminal at which the first current collector contacts the first terminal.

Each of the plurality of connection members and the first current collector may include copper, the first terminal may include aluminum, and each of the first plating and the second plating may include at least one of tin, nickel or zinc.

As described above, in the secondary battery and the secondary battery module according to embodiments of the present invention, corrosion formation at a current path of the secondary battery may be reduced or minimized and the weight of the secondary battery may be lowered due to reduction of the weight of the current path.

Additional aspects and/or features of the invention will be set forth in part in the description which follows and, in part, will be obvious from the description, or may be learned by practice of the invention.

BRIEF DESCRIPTION OF THE DRAWINGS

The features and aspects of the present invention will be more apparent from the following detailed description in conjunction with the accompanying drawings, in which.

DETAILED DESCRIPTION

In the following detailed description, certain exemplary embodiments of the present invention are shown and described by way of illustration. As those skilled in the art would recognize, the invention may be embodied in many different forms and should not be construed as being limited to the embodiments set forth herein.

Figure 1:
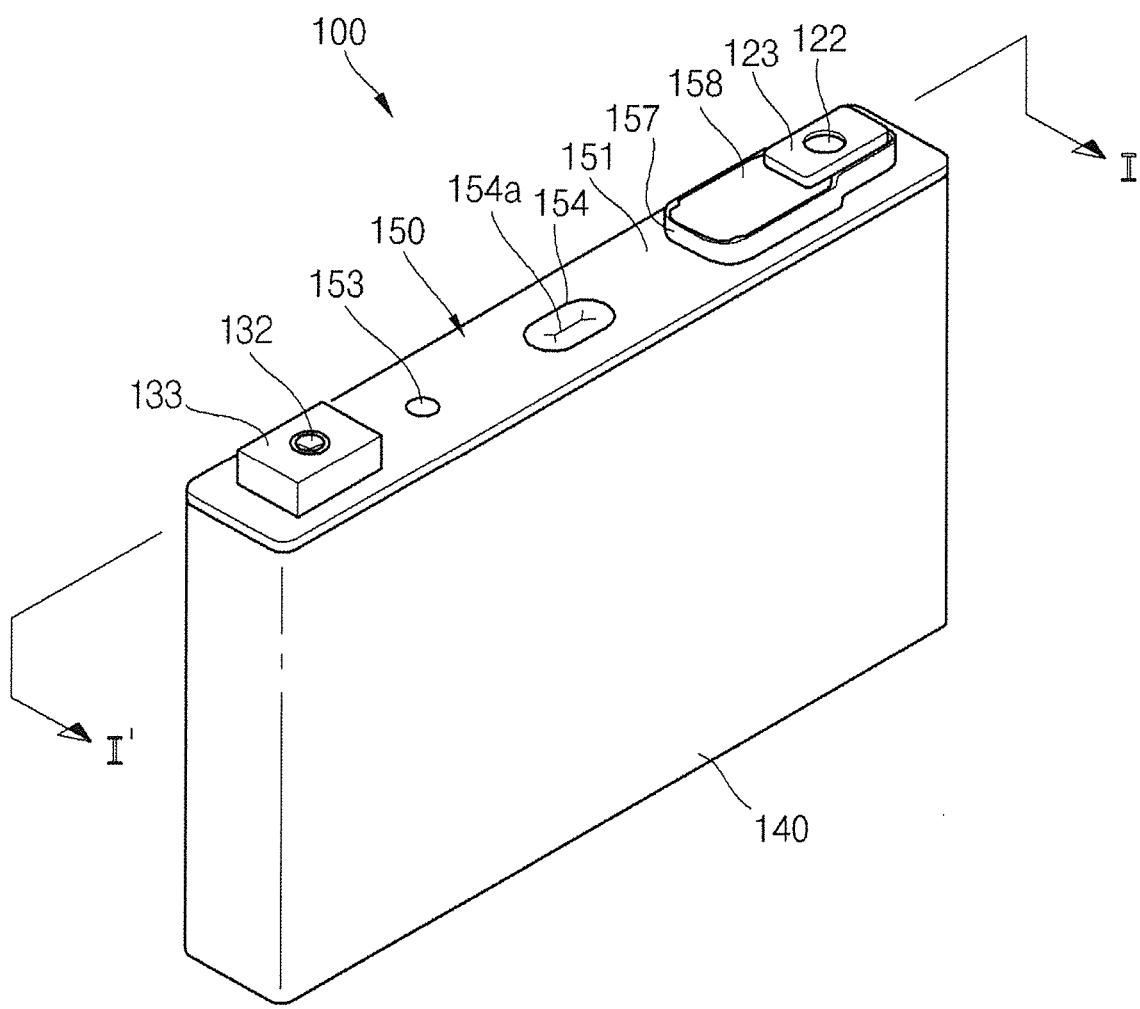
FIG. 1 is a perspective view of a secondary battery according to an embodiment of the present invention.
Figure 2:
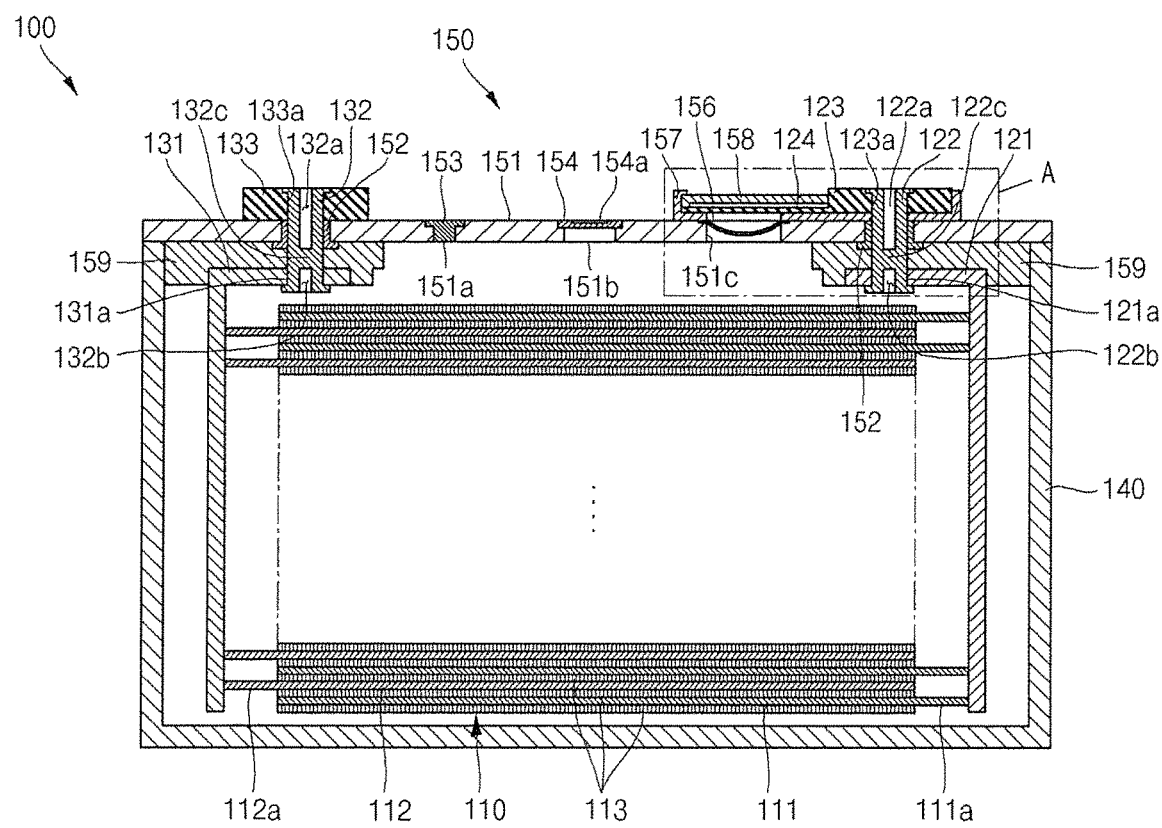
FIG. 2 is a cross-sectional view of the secondary battery taken along the line I-I' of FIG. 1.
Figure 3:
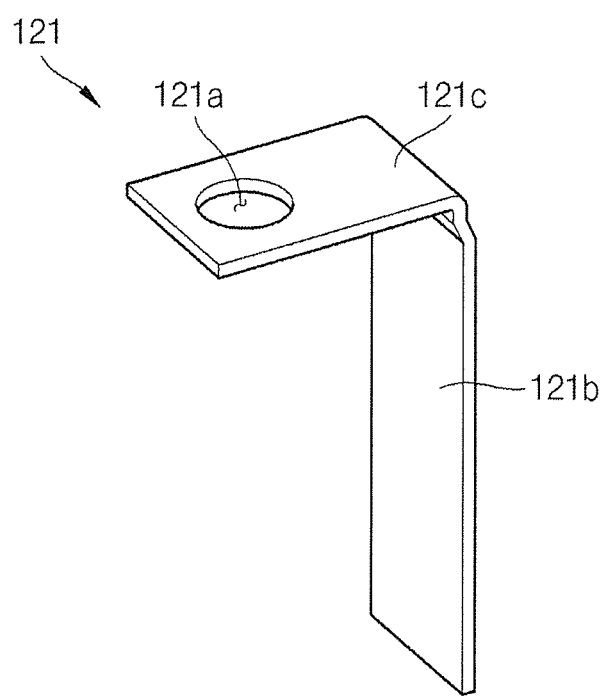
FIG. 3 is a perspective view of a first current collector according to an embodiment of the present invention.
Figure 4:
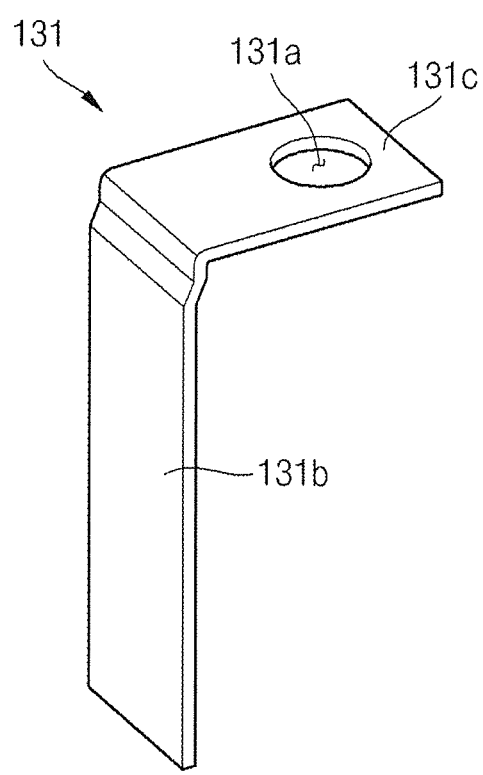
FIG. 4 is a perspective view of a second current collector according to an embodiment of the present invention.
Figure 7A:
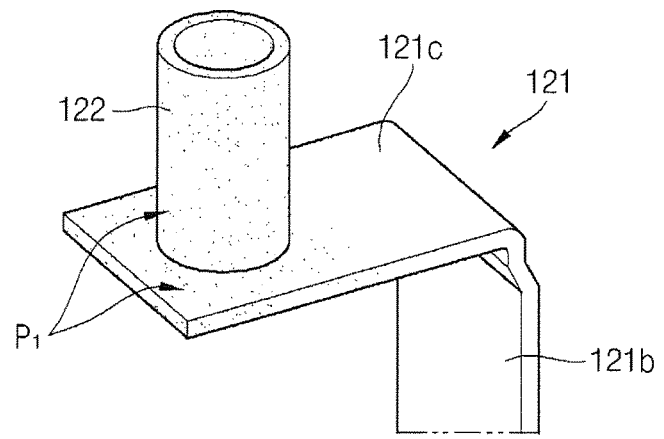
Figure 7B:
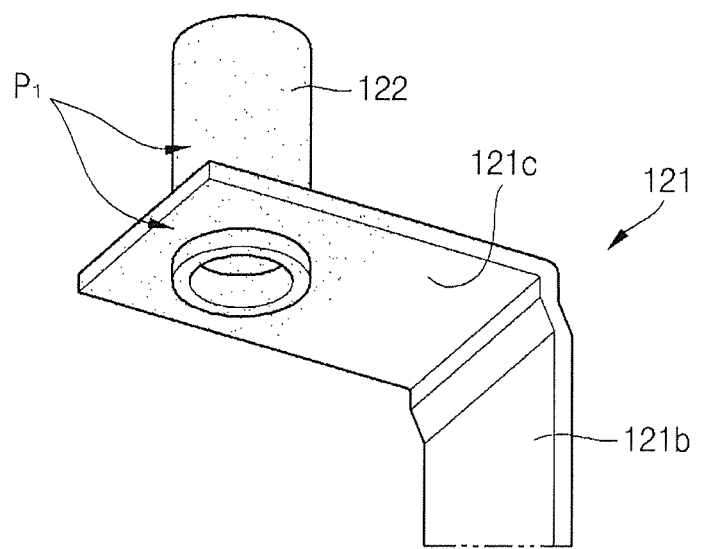
Figure 8:
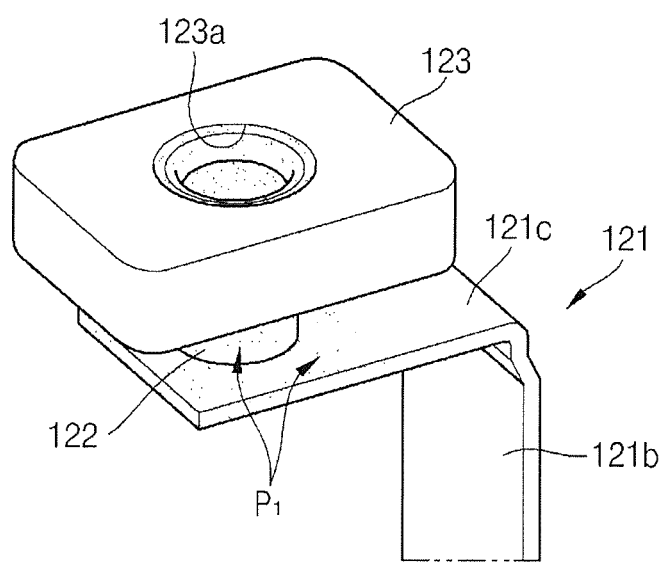
FIG. 8 is a perspective view illustrating a connection structure of a first current collector, a first terminal, and a first terminal plate according to an embodiment of the present invention.
Figure 9A:
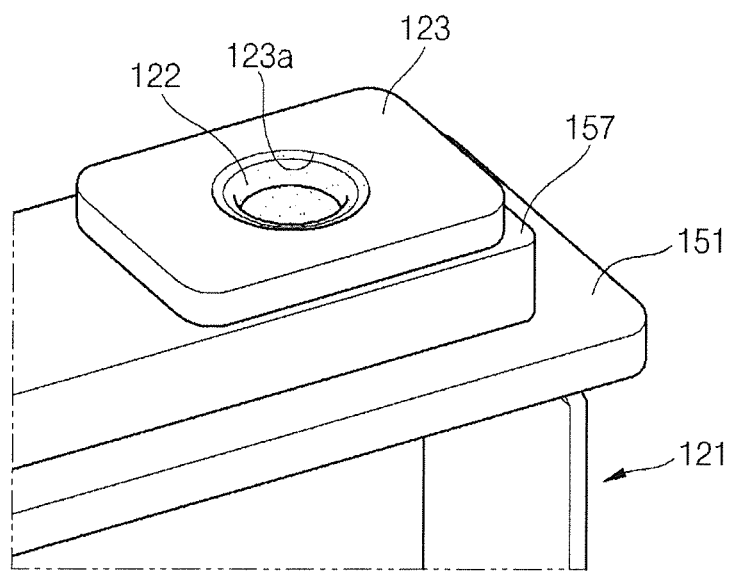
FIGS. 9A and 9B are perspective views illustrating an 'A' region of FIG. 2.
Figure 9B:
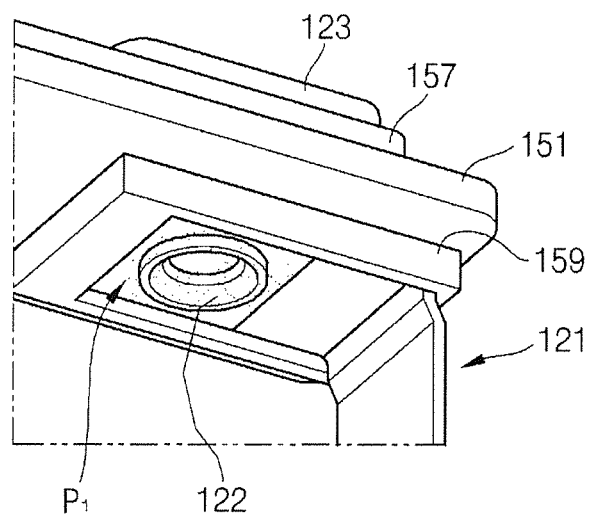

FIG. 1 is a perspective view of a secondary battery (100) according to an embodiment of the present invention; FIG. 2 is a cross-sectional view of the secondary battery (100) taken along the line I-I' of FIG. 1; FIG. 3 is a perspective view of a first current collector (121) according to an embodiment of the present invention; FIG. 4 is a perspective view of a second current collector (131) according to an embodiment of the present invention; FIGS. 5 to 7B are perspective views illustrating a connection structure of a first current collector (121) and a first terminal pin (122) according to an embodiment of the present invention; FIG. 8 is a perspective view illustrating a connection structure of a first current collector (121) and a first terminal (122, 123); and FIGS. 9A and 9B are perspective views illustrating an 'A' region of FIG. 2.

Referring to FIGS. 1 and 2, the secondary battery 100 may include an electrode assembly 110, a first current collector 121, a first terminal 122 and 123, a second current collector 131, a second terminal 132 and 133, and a case 140. The secondary battery 100 may further include a cap assembly 150.

As shown in FIG. 2, the electrode assembly 110 is formed by winding or laminating a stacked structure having a first electrode plate 111, a separator 113, and a second electrode plate 112, which are formed as thin plates or layers. Here, the first electrode plate 111 may function as a negative electrode and the second electrode plate 112 may function as a positive electrode, or vice versa.

The first electrode plate 111 may be formed by applying a first electrode active material, such as graphite or carbon, on a first electrode collector formed of metal foil, such as nickel or copper foil. The first electrode plate 111 may include a first electrode uncoated portion 111a on which the first electrode active material is not applied. The first electrode uncoated portion 111a may function as a passage for current flowing between the first electrode plate 111 and the outside of the first electrode plate 111. Meanwhile, the present invention does not limit the material of the first electrode plate 111 to those listed herein.

The second electrode plate 112 may be formed by applying a second electrode active material, such as a transition metal, on a second electrode collector plate formed of metal foil, such as aluminum foil. The second electrode plate 112 may include a second electrode uncoated portion 112a on which the second electrode active material is not applied. The second electrode uncoated portion 112a may function as a passage for current flowing between the second electrode plate 112 and the outside of the second electrode plate 112. Meanwhile, the present invention does not limit the material of the second electrode plate 112 to those listed herein.

In other implementations, the relative polarities of the first and second electrode plates 111 and 112 may differ from what is described above.

The separator 113 may be located (e.g., disposed) between the first electrode plate 111 and the second electrode plate 112 to prevent short circuiting and allow the movement of lithium ions. The separator 113 may be formed of, for example, polyethylene, polypropylene, or a composite film of polypropylene and polyethylene. Meanwhile, the present invention does not limit the material of the separator 113 to those listed herein.

The electrode assembly 110 and electrolyte are contained in the case 140. The electrolyte may include an organic solvent such as ethylene carbonate (EC), propylene carbonate (PC), diethyl carbonate (DEC), ethyl methyl carbonate (EMC), or dimethyl carbonate (DMC), and a lithium salt such as $LiPF_6$ or $LiBF_4$. The electrolyte may be a liquid, a solid, or a gel.

The first current collector 121 and the second current collector 131 are electrically connected to the first electrode plate 111 and the second electrode plate 112, respectively, and are coupled to opposite ends of the electrode assembly 110.

The first current collector 121 may be formed of, for example, copper, a copper alloy, or an equivalent thereof. The first current collector 121 may include a first connection plate 121b and a first extension plate 121c and may be formed in an approximately 'L' shape, as shown in FIG. 3.

The first connection plate 121b may be coupled to the first electrode plate 111 of the electrode assembly 110. More specifically, the first connection plate 121b may be coupled to the first electrode uncoated portion 111a of the first electrode plate 111 by, for example, resistance welding.

Figure 5:
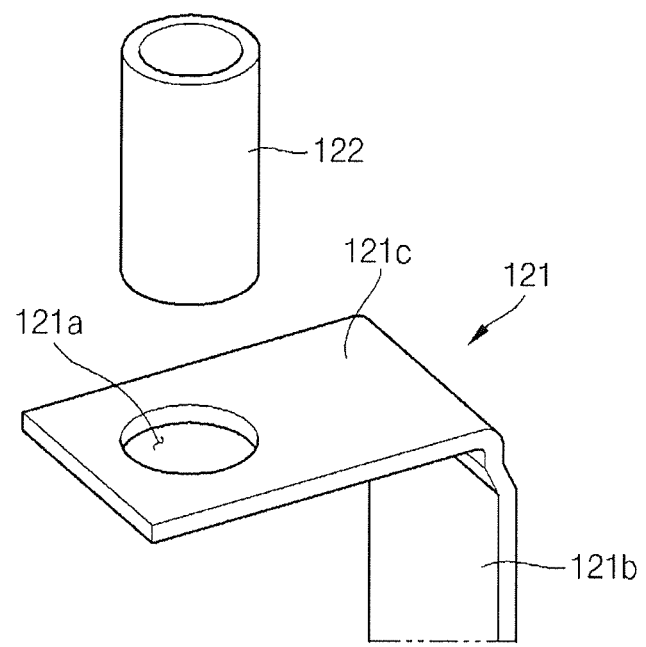
FIGS. 5 to 7B are perspective views illustrating a connection structure of a first current collector and a first terminal pin according to an embodiment of the present invention.

The first extension plate 121c may be bent to be substantially perpendicular to the first connection plate 121b and may extend from one side of the first connection plate 121b. A first coupling hole (e.g., first opening) 121a may be formed at one side of the first extension plate 121c to be coupled to the first terminal pin 122, as shown in FIG. 5.

The second current collector 131 may be formed of, for example, aluminum, an aluminum alloy, or an equivalent thereof. The second current collector 131 may include a second connection plate 131b and a second extension plate 131c and may be formed in an approximately 'L' shape, as shown in FIG. 4.

The second connection plate 131b may be coupled to the second electrode plate 112 of the electrode assembly 110. More specifically, the second connection plate 131b may be coupled to the second electrode uncoated portion 112a of the second electrode plate 112 by, for example, resistance welding.

The second extension plate 131c may be bent to be substantially perpendicular to the second connection plate 131b and may extend from one side of the second connection plate 131b. A first coupling hole (e.g., first opening) 131a may be formed at one side of the second extension plate 131c to be coupled to the second terminal pin 132.

The first terminal 122 and 123 may include a first terminal pin 122 and a first terminal plate 123.

The first terminal pin 122 may have a substantially cylindrical shape, and may be formed of at least one selected from the group consisting of copper, a copper alloy, aluminum, an aluminum alloy, and equivalents thereof.

As shown in FIG. 2, first and second holes (e.g., cavities or hollow grooves) 122a and 122b and a first blocking part 122c may be formed in the first terminal pin 122. The first and second holes 122a and 122b may be formed to have a predetermined depth along the central axis of the first terminal pin 122. The first hole (e.g., first cavity) 122a may extend from a second side toward a first side of the first terminal pin 122. The second hole (e.g., second cavity) 122b may extend from a first side toward a second side of the first terminal pin 122.

In addition, the first blocking part 122c may be formed in the first terminal pin 122. The first blocking part 122c may prevent the first and second holes (e.g., cavities or hollow grooves) 122a and 122b and the first side and second side of the terminal pin 122 from communicating with each other through the first terminal pin 122 and may seal the case 140.

Figure 6A:
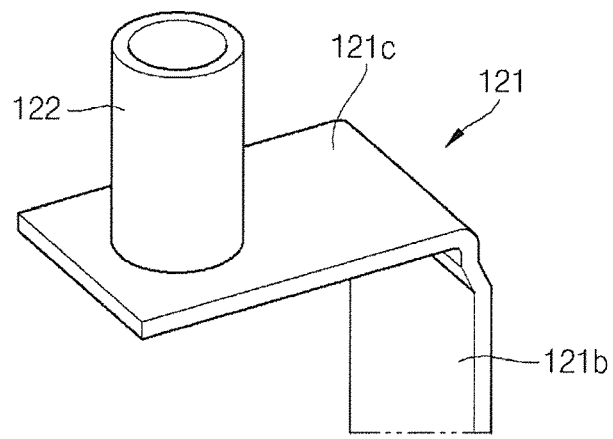
Figure 6B:
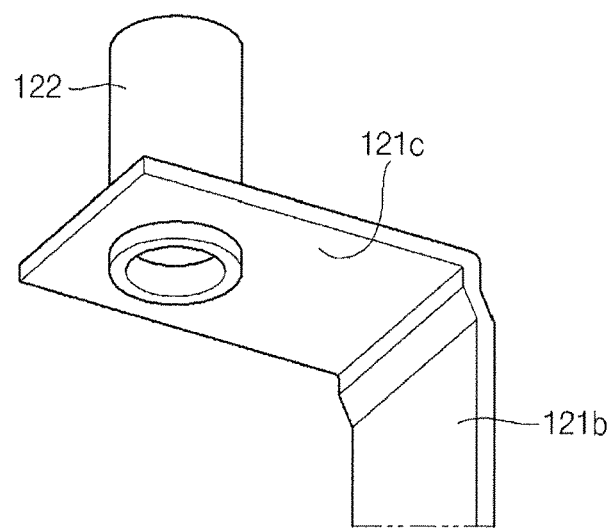

As shown in FIGS. 5 and 6A, a first side of the first terminal pin 122 may be coupled to the first coupling hole 121a of the first current collector 121, and, as shown in FIG. 6B, the first terminal pin 122 may be coupled to the first current collector 121 by, for example, riveting.

The first terminal pin 122 is one of a plurality of components forming a current path of the secondary battery 100, in cooperation with the first current collector 121, and has a semi-hollow structure (e.g., half-hollow structure), including a plurality of holes (e.g., cavities or hollow grooves) 122a and 122b and a blocking part 122c, thereby reducing the weight of the current path compared with a conventional bulk-type current path. Accordingly, the first terminal pin 122 may result in the reduction of the weight of the secondary battery 100.

Meanwhile, when the first terminal pin 122 is formed of, for example, aluminum, and the first current collector 121 is formed of, for example, copper, corrosion may occur due to contact and coupling of metals with a large potential difference. The corrosion may occur at a connection area adjacent to the first current collector 121 and the first terminal pin 122. In particular, the corrosion may become more severe toward the first current collector 121. Therefore, when the first terminal pin 122 includes aluminum or an aluminum alloy, as shown in FIGS. 7A and 7B, a plating (e.g., coating) P1 may be applied to a portion adjacent to a connection area including the first terminal pin 122 and first current collector 121. Here, the connection area of the first terminal pin 122 and the first current collector 121 refers to a substantially contacting portion of the first terminal pin 122 and the first current collector 121. The portion having the plating P1 is a portion adjacent to the connection area between the first terminal pin 122 and a portion of the first extension plate 121c. That is to say, the portion having the plating P1 may include the entire first terminal pin 122 and a region (e.g., a predetermined region) of the first extension plate 121c adjacent to the first coupling hole 121a. The plating P1 may function as a sacrificial positive electrode for the first terminal pin 122 and may prevent outside interference or influence on the connection area of the first current collector 121 and the first terminal pin 122, thereby preventing corrosion of the first terminal pin 122.

The plating (e.g., coating) P1 may include tin, nickel, or zinc, or an alloy including a combination of these metals.

As shown in FIGS. 9A and 9B, the first terminal plate 123 may be spaced apart from a top portion of the cap plate 151. Specifically, an upper insulation member 157 may be located (e.g., disposed) between the first terminal plate 123 and a top portion of the cap plate 151.

A second coupling hole (e.g., second opening) 123a may be formed in the first terminal plate 123. Thus, as shown in FIG. 8, a second side of the first terminal pin 122 of the first terminal 122 and 123 may be fitted into and joined with, for example, by riveting, the second coupling hole 123a, thereby allowing the first terminal plate 123 and the first terminal pin 122 to be coupled to each other. Accordingly, the first current collector 121, the first terminal pin 122, and the first terminal plate 123 are electrically connected to each other and are electrically insulated from the cap plate 151 by the upper insulation member 157.

Meanwhile, the first terminal plate 123 may further include an extension part 124, and the extension part 124 may be integrally formed or joined with the first terminal plate 123. The cap plate 151 may further include a short-circuit plate 156. When an internal pressure of the secondary battery 100 exceeds a predetermined pressure, the short-circuit plate 156 becomes inverted and protrudes to be upwardly convex to make contact with the extension part 124 of the first terminal plate 123, causing short circuiting. If the short circuiting is caused, a large amount of current may flow through the secondary battery 100, generating heat. In this case, a fuse part (not shown) formed in the first current collector 121 or the second current collector 131 may melt to cut off the flow of current.

The first terminal plate 123 and the extension part 124 may be formed of any suitable material selected from copper, a copper alloy, aluminum, an aluminum alloy, and equivalents thereof.

The second terminal 132 and 133 may include a second terminal pin 132 and a second terminal plate 133.

The second terminal pin 132 may have a substantially cylindrical shape and may include at least one selected from the group consisting of aluminum, an aluminum alloy, and equivalents thereof.

A first side of the second terminal pin 132 may be fitted into a first coupling hole 131a of the second current collector 131 and then joined, for example, by riveting.

First and second holes (e.g., cavities or hollow grooves) 132a and 132b and a second blocking part 132c may be formed in the second terminal pin 132. The first and second holes 132a and 132b may be formed to have a predetermined depth along the central axis of the second terminal pin 132. The first hole 132a may extend from a second side toward a first side of the second terminal pin 132. The second hole 132b may extend from a first side toward a second side of the second terminal pin 132.

In addition, the second blocking part 132c may be formed in the second terminal pin 132. The second blocking part 132c may prevent the first and second holes 132a and 132b and the first side and the second side of the terminal pin 132 from communicating with each other through the second terminal pin 132 and may seal the case 140.

The second terminal pin 132 is one of the plurality of components forming a current path of the secondary battery 100, in cooperation with the second current collector 131, and has a semi-hollow (e.g., half-hollow) structure including a plurality of holes (e.g., cavities or hollow grooves) 132a and 132b and a blocking part 132c, thereby reducing the weight of the current path compared with a conventional bulk-type current path. Accordingly, the second terminal pin 132 may lower the weight of the secondary battery 100.

The second terminal plate 133 may be located (e.g., disposed) on a top portion of the cap plate 151. A second coupling hole (e.g., second opening) 133a may be formed in the second terminal plate 133. Thus, a second side of the second terminal pin 132 of the second terminal 132 and 133 may be fitted into the second coupling hole 133a and then joined, for example, by riveting, thereby allowing the second terminal plate 133 and the second terminal pin 132 to be coupled to each other. Accordingly, the second current collector 131, the second terminal pin 132, and the second terminal plate 133 may be electrically connected to each other.

The second terminal plate 133 may be formed of any suitable material selected from aluminum, an aluminum alloy, and equivalents thereof.

The case 140 may be formed of a conductive metal, such as aluminum, an aluminum alloy, or a nickel plated steel and may have an approximately hexahedron shape provided with an opening through which the electrode assembly 110 and the first and second current collectors 121 and 131 are inserted and placed. Since the case 140 and the cap assembly 150 are illustrated in an assembled state in FIG. 2, the opening of the case 140 is not shown. However, the opening of the case 140 corresponds to a substantially opened portion along the periphery of the cap assembly 150. Meanwhile, the inner surface of the case 140 may be treated to be insulated from the electrode assembly 110, the first and second terminals 122, 123, 132 and 133, the first and second current collectors 121 and 131, and the cap assembly 150.

The cap assembly 150 may be coupled to the case 140. In detail, the cap assembly 150 may include the cap plate 151, seal gaskets 152, a plug 153, a safety vent 154, the short-circuit plate 156, the upper insulation member 157 and the lower insulation member 159.

The cap plate 151 closes the opening of the case 140. The cap plate 151 may be formed of the same material as that of the case 140. The cap plate 151 may have an electrolyte injection hole 151a, a vent hole 151b, and a short-circuit hole 151c. The cap plate 151 may have through holes through which the first and second terminal pins 122 and 132, respectively, pass. The cap plate 151 may be coupled to the case 140 by, for example, laser welding.

The seal gaskets 152 may be formed of an insulating material and may be located (e.g., disposed) between the first terminal pin 122 and the cap plate 151 and between the second terminal pin 132 and the cap plate 151 to seal spaces between each of the first and second terminal pins 122 and 132 and the cap plate 151. The seal gaskets 152 may prevent external moisture from penetrating into the secondary battery 100 or the leakage of the electrolyte from the secondary battery 100.

The plug 153 may close the electrolyte injection hole 151a of the cap plate 151. The safety vent 154 may be installed in the vent hole 151b of the cap plate 151 and may have a notch 154a to be opened at a set pressure.

A short-circuit plate 156 may be formed (e.g., located) in the short-circuit hole 151c of the cap plate 151. The short-circuit plate 156 may include a round region that is downwardly convex and a region surrounding the round region that is substantially flat and fixed to the cap plate 151. The short-circuit plate 156 becomes inverted when the internal pressure of the secondary battery 100 exceeds the set pressure and protrudes to be upwardly convex to make contact with the extension part 124 of the first terminal plate 123, causing short circuiting. Here, the short-circuit plate 156 and the cap plate 151 may have the same polarity.

As shown in FIGS. 2 and 9A, the upper insulation member 157 may be formed to accommodate the first terminal pin 122 and may be located (e.g., disposed) between the first terminal plate 123 and the cap plate 151. The upper insulation member 157 may further include a cover part 158. The cover part 158 may be detachably coupled to the upper insulation member 157 to cover a top portion of the extension part 124 of the first terminal plate 123.

As shown in FIGS. 2 and 9B, the lower insulation member 159 may be formed (e.g., located) between the first current collector 121 and the cap plate 151 and also between the second current collector 131 and the cap plate 151, thereby preventing unintended or unnecessary short circuiting. That is to say, the lower insulation member 159 prevents short circuiting between the first current collector 121 and the cap plate 151 and short circuiting between the second current collector 131 and the cap plate 151. In addition, the lower insulation member 159 may be formed (e.g., located) between the first terminal pin 122 and the cap plate 151 and the second terminal pin 132 and the cap plate 151, thereby preventing unintended or unnecessary short circuiting between the first and second terminal pins 122 and 132 and the cap plate 151.

Figure 10:
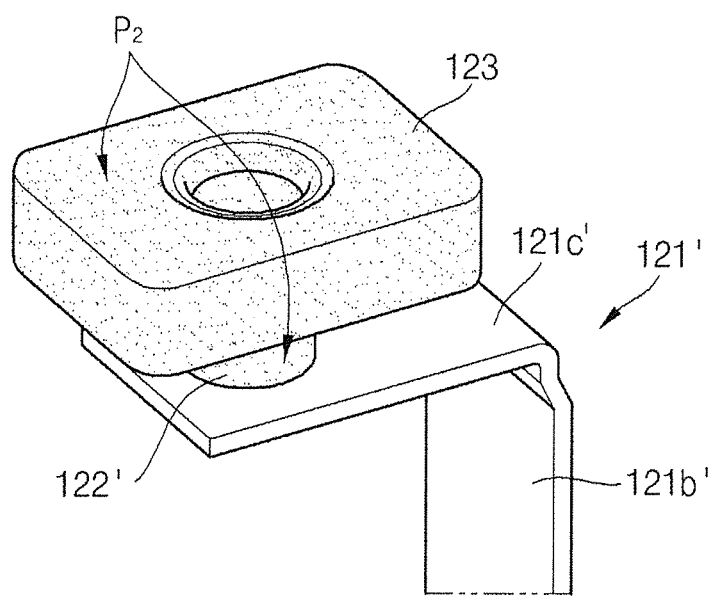
FIG. 10 is a perspective view illustrating another example of a connection structure of a first current collector, a first terminal pin, and a first terminal plate according to an embodiment of the present invention.

FIG. 10 is a perspective view illustrating another example of a connection structure of a first current collector and a first terminal according to an embodiment of the present invention.

Unlike the first current collector 121 and the first terminal 122 and 123 as shown in FIGS. 5 to 8, a first current collector 121' shown in FIG. 10 may include a first connection plate 121b', a first extension plate 121c' and a first terminal pin 122', but the first terminal shown in FIG. 10 may include the first terminal plate 123 as shown in FIG. 8. That is to say, as shown in FIG. 10, the first terminal pin 122' may include the same material as the first current collector 121' rather than the same material as the first terminal plate 123 as illustrated in the aforementioned configuration example and as shown in FIGS. 5 to 8. In addition, unlike in the aforementioned configuration example, the first terminal pin 122' shown in FIG. 10 may be formed of the same metal as the first connection plate 121*b*' and the first extension plate 121*c*'. For example, the first terminal pin 122', the first connection plate 121*b*' and the first extension plate 121*c*' may be formed of copper or a copper alloy. The other functions and components are the same as those of the aforementioned configuration example.

In this case, corrosion may be generated due to contact and coupling between the first terminal pin 122' (formed of copper) and the first terminal plate 123 (formed of aluminum) due to potential difference between the materials. Thus, in order to prevent the corrosion, a plating (e.g., a coating) P2 may be applied at the first terminal pin 122' and the first terminal plate 123. The plating P2 may function as a sacrificial positive electrode of the first terminal pin 122' and may prevent outside interference or influence on the connection area of the first terminal pin 122' and the first terminal plate 123, thereby preventing corrosion of the first terminal plate 123. The plating P2 may include tin, nickel, or zinc, or an alloy including a combination of these metals.

Figure 11:
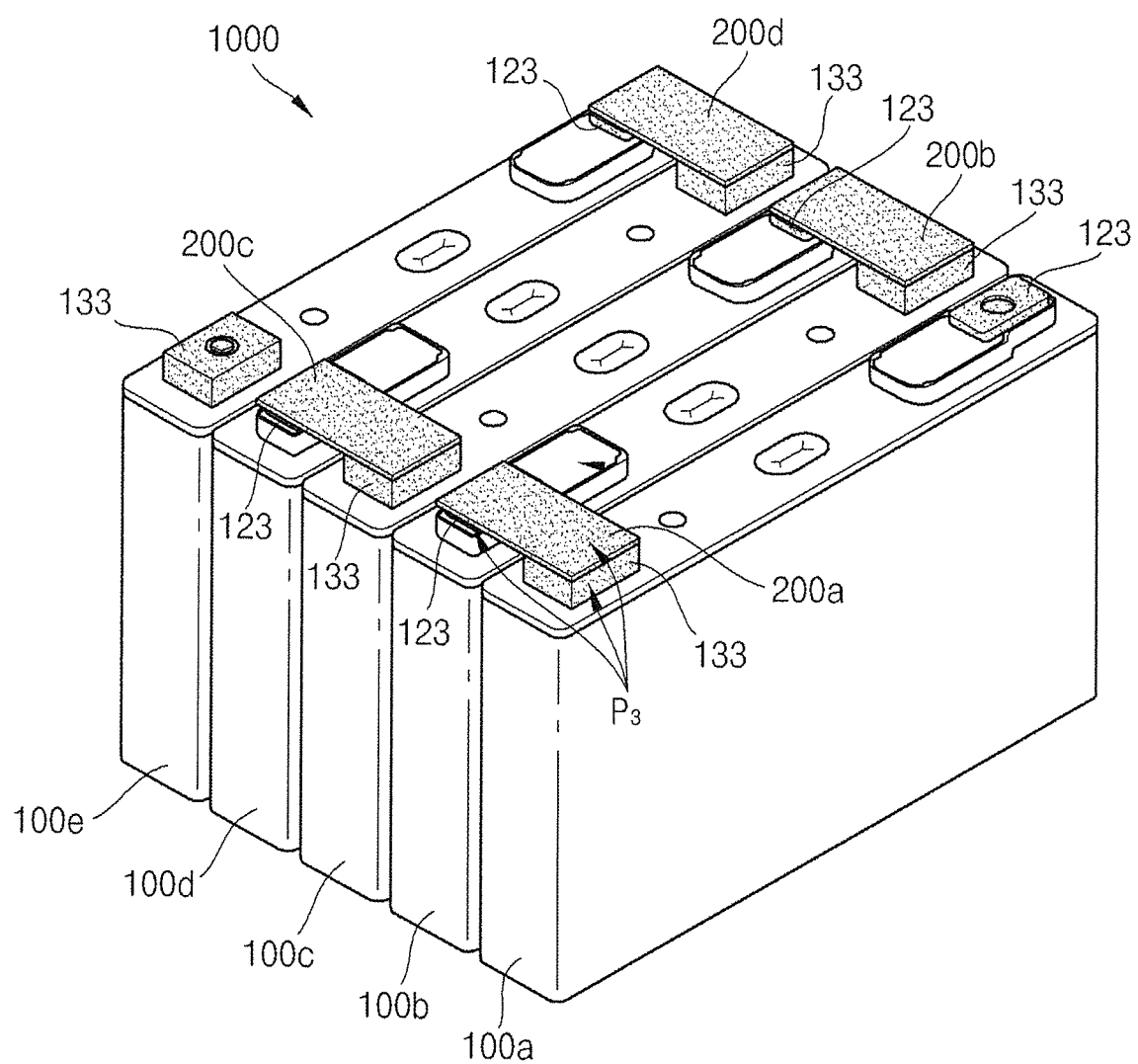
FIG. 11 is a perspective view of a secondary battery module according to another embodiment of the present invention.

FIG. 11 is a perspective view of a secondary battery module (1000) according to another embodiment of the present invention.

Referring to FIG. 11, the secondary battery module 1000 includes a plurality of secondary batteries 100*a*, 100*b*, 100*c*, 100*d*, and 100*e* and a plurality of connection members 200*a*, 200*b*, 200*c*, and 200*d*.

Each one of the plurality of secondary batteries 100*a*, 100*b*, 100*c*, 100*d*, and 100*e* has the same configuration as the secondary battery 100 according to an embodiment of the present invention. However, the plurality of secondary batteries 100*a*, 100*b*, 100*c*, 100*d*, and 100*e* are connected to each other in series by the plurality of connection members 200*a*, 200*b*, 200*c*, and 200*d*.

Each of the connection members 200*a*, 200*b*, 200*c*, and 200*d* may be a plate and may electrically connect neighboring ones among the plurality of secondary batteries 100*a*, 100*b*, 100*c*, 100*d*, and 100*e*.

For example, when the first to fourth connection members 200*a*, 200*b*, 200*c*, and 200*d* are provided and the first to fifth secondary batteries 100*a*, 100*b*, 100*c*, 100*d*, and 100*e* are sequentially arranged in parallel with each other, the first connection member 200*a* may electrically connect a second terminal plate 133 of the first secondary battery 100*a* to a first terminal plate 123 of the second secondary battery 100*b*. In addition, the second connection member 200*b* may electrically connect the second terminal plate 133 of the second secondary battery 100*b* to a first terminal plate 123 of the third secondary battery 100*c*. In addition, the third connection member 200*c* may electrically connect a second terminal plate 133 of the third secondary battery 100*c* to a first terminal plate 123 of the fourth secondary battery 100*d*. In addition, the fourth connection member 200*d* may electrically connect a second terminal plate 133 of the fourth secondary battery 100*d* to a first terminal plate 123 of the fifth secondary battery 100*e*. Here, the connection members 200*a*, 200*b*, 200*c*, and 200*d* may be coupled to the first and second terminal plates 123 and 133 by, for example, laser welding or tungsten inert gas (T.I.G.) welding.

The connection members 200*a*, 200*b*, 200*c*, and 200*d* may be formed from one selected from the group consisting of copper, a copper alloy, aluminum, an aluminum alloy, and equivalents thereof. Here, when the connection members 200*a*, 200*b*, 200*c*, and 200*d* are formed of copper and the first and second terminal plates 123 and 133 are formed of aluminum, in order to prevent corrosion, a plating (e.g., coating) P3 may be applied at each of the first and second terminal plates 123 and 133 and portions adjacent to the connection members 200*a*, 200*b*, 200*c*, and 200*d*. Here, the portions correspond to substantially contacting portions formed when the first and second terminal plates 123 and 133 are coupled to the connection members 200*a*, 200*b*, 200*c*, and 200*d*. That is to say, the contacting portions may be regions (e.g., predetermined regions) of the first and second terminal plates 123 and 133 and the connection members 200*a*, 200*b*, 200*c*, and 200*d* adjacent to the connection portions. For example, the plating P3 may be applied at each of the connection members 200*a*, 200*b*, 200*c*, and 200*d* and each of the first and second terminal plates 123 and 133. The plating (e.g., coating) P3 may include tin, nickel, or zinc, or an alloy including a combination of these metals.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims and their equivalents.

What is claimed is:

1. A secondary battery comprising:
   an electrode assembly comprising a first electrode plate, a second electrode plate, and a separator;
   a case containing the electrode assembly;
   a first current collector electrically connected to the first electrode plate and having a first opening, the first current collector being inside of the case;
   a first terminal electrically connected to the first current collector, the first terminal comprising:
      a first terminal plate having a second opening and being outside of the case; and
      a first terminal pin having a first end inside the case and a second end outside of the case, the first end being fitted into the first opening and the second end being fitted into the second opening;
   a second current collector electrically connected to the second electrode plate; and
   a second terminal electrically connected to the second current collector,
   wherein an electrically conductive plating is coated on both of the first and second ends of the first terminal pin and on the first current collector at where the first terminal pin contacts the first current collector and on a first portion of the first current collector adjacent where the first terminal pin contacts the first current collector, and
   wherein the electrically conductive plating is not on a second portion of the first current collector.

2. The secondary battery of claim 1, wherein the first current collector comprises copper, the first terminal comprises aluminum, and the plating comprises at least one of tin, nickel, or zinc.

3. The secondary battery of claim 1, wherein the plating is on the first terminal pin at where the first terminal pin contacts the first terminal plate.

4. The secondary battery of claim 3, wherein the first end of the first terminal pin has a riveted portion around the first opening, and the second end of the first terminal pin has a riveted portion around the second opening.

5. The secondary battery of claim 3, wherein the first terminal pin has one or more cavities having a depth along a central axis of the first terminal pin in at least one of the first end or the second end, and a first blocking part blocking a communication between the first end and the second end through the first terminal pin.

6. The secondary battery of claim 3, wherein the plating is on a portion of the first current collector adjacent to the first opening.

7. The secondary battery of claim 1, wherein the plating is coated on opposite top and bottom sides of the first current collector, the bottom side of the first current collector facing the electrode assembly.

8. The secondary battery of claim 1, wherein the plating is coated on the entire first terminal pin.

* * * * *